(No Model.)
W. L. BLISS.
SYSTEM OF AUTOMATIC ELECTRIC REGULATION.
No. 572,627. Patented Dec. 8, 1896.
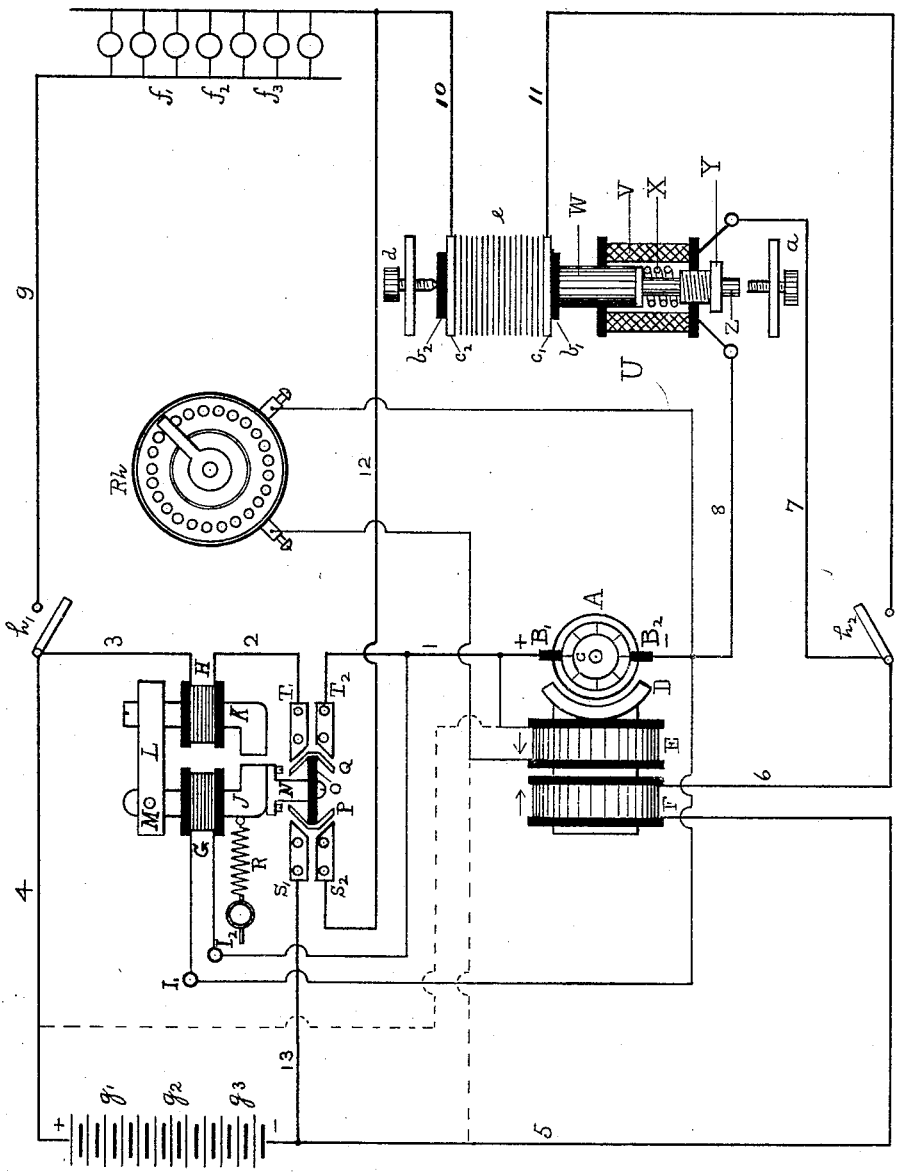
WITNESSES:
John L. Bliss
G. L. Bliss.
INVENTOR
William L. Bliss.

UNITED STATES PATENT OFFICE.

WILLIAM L. BLISS, OF BROOKLYN, NEW YORK.

SYSTEM OF AUTOMATIC ELECTRIC REGULATION.

SPECIFICATION forming part of Letters Patent No. 572,627, dated December 8, 1896.

Application filed May 6, 1896. Serial No. 590,431. (No model.)

*To all whom it may concern:*

Be it known that I, WILLIAM L. BLISS, a citizen of the United States, and a resident of Brooklyn, in the county of Kings and State of New York, have invented a certain new and useful Improved System of Automatic Electric Regulation, of which the following is a specification.

The object of my invention is to provide a method of automatic regulation in a system of electric lighting wherein a dynamo-electric machine or generator driven at varying speeds from an intermittent source of power furnishes the electrical energy for operating translating devices in a working circuit, or which, by storing in addition electrical energy by charging a suitable storage battery or electric accumulator, enables said translating devices to be operated continuously.

If in a system of electric lighting as described the variation in the speed of the dynamo be considerable, it is, in general, advisable to adopt some method of regulation which, while permitting the dynamo to operate at a low speed, will also so control the output of the same at a high speed that no injury to the machine will result. If also the translating devices operated by the dynamo or by the electrical energy stored by the dynamo in accumulators for that purpose be of such a nature that a constant electromotive force should be maintained at their terminals, then further means must be supplied to secure such a result. Systems of the nature described are met with in the electric lighting of railway-trains, where a dynamo deriving its motion from the car on which it is located or some part thereof is employed for charging storage batteries which are carried on said car for the purpose of illuminating the same, and also in electric-lighting plants operated by windmills or by any source of varying intermittent power.

A number of methods for approximately securing the regulation of a dynamo employed as herein described have been devised, among which was an invention of Messrs. Crompton and Swinburne, to whom an English patent, No. 5,168 of 1886, was granted. This method, while perfectly controlling the output of the dynamo, fails to maintain a constant electromotive force on the lamps. According to their description the dynamo is connected to the system when its electromotive force becomes equal to that of the storage battery. At this juncture the dynamo sends no current to the battery. The lamps are connected as a shunt directly to the armature of the dynamo. If the dynamo is to charge the batteries, its electromotive force must be raised somewhat to do so, and this is accomplished when the dynamo runs a little faster; but the lamps are subjected to this increased electromotive force, and hence do not remain at a constant brilliancy, but increase in candle-power as the train runs faster.

My invention consists in the addition of such devices to the Crompton and Swinburne patent as will render the same suitable for the purpose for which it was intended.

In the accompanying drawing, A represents the armature of a direct-current dynamo; $B'$ $B^2$, the brushes of said dynamo, which bear upon the commutator C.

D represents the field-magnet of said dynamo, upon which are wound two coils or sets of coils E and F, respectively, the coil E being the fine-wire shunt, which is connected directly across the brushes $B'$ and $B^2$ and which normally excites the dynamo, while coil F is of coarse wire capable of carrying the maximum current supplied by the dynamo. The purposes the coil F serves and the manner of connecting it with the other parts of the system will be described later.

G and H are the coils of an electromagnet, G being wound with fine wire, the ends of which terminate in the terminals $I'$ $I^2$, and $I'$ $I^2$ are connected to the brushes $B'$ and $B^2$, respectively, while the coil H is of coarse wire capable of carrying safely the full current delivered by the dynamo.

The coils G and H surround the soft-iron cores J and K, respectively, said cores being connected to the yoke L. The yoke L and the core K are fastened rigidly together, while the core J is loosely pivoted to the yoke L, so as to be free to turn about the pivot M. The cores J and K are bent at right angles at their lower ends in order to bring them into closer magnetic relation to one another. The core J carries an arm N, to which is attached an insulating-block O. The insulating-block O carries on its ends conducting contact-wedges P and Q. A retractile spring R tends to maintain the core J in such a position that the contact-wedge P will make electrical connection between the conducting-blocks S' and S². Whenever there exists sufficient magnetic pull between the free ends of the cores J and K to overcome the tension of the spring R, the core J will move so as to enable the contact-wedge Q to establish electrical connection between the conducting-blocks T' and T².

U is an electromagnet, which may be of any convenient form, but which is here represented as consisting of a simple single-coil solenoid or coil V and a soft-iron core or plunger W. Said plunger W is made, preferably, of soft iron or a bundle of soft-iron wires. Said plunger W is attracted or drawn into the coil V whenever sufficient current passes through said coil to produce a magnetic pull on said plunger W greater than the expanding force exerted against said plunger W by the spring X. The tension of the spring X is regulated by the nut Y. A tail-rod Z is fastened to the end of the plunger W and extends through the spring X and the nut Y. The adjusting-screw $a$ serves to limit and adjust the movement of the plunger W and the tail-rod Z. A block of insulating material $b'$ is fastened to the plunger W, as shown, and upon said block is secured a conducting plate or terminal $c'$.

$b^2$ and $c^2$ are counterparts of the block $b'$ and the plate $c'$, but are held fixed and immovable with reference to the plunger W. An adjusting-screw $d$ serves to adjust the position of the block $b^2$ and the terminal $c^2$. Between the conducting plates or terminals $c'$ and $c^2$ is confined a series or column of carbon disks $e$. I prefer to use a column of carbon disks, although a column of plates or disks of any other poorly-conducting material might be used. In fact a spiral of carbon or of any other material might similarly be employed. This column of carbon disks is included in the circuit with the lamps $f'$ $f^2$ $f^3$ and constitutes a resistance whose value is dependent upon the amount of pressure to which said column of carbon disks is subjected. It is a well-known fact that the electrical resistance through a column of carbon disks, as above described, is dependent upon the closeness of contact between the disks and also upon the pressure exerted upon the carbon in the individual disk. Both of these quantities are increased or diminished by increasing or decreasing the pressure upon the whole column of carbon disks, and the electrical resistance of said column of carbon disks is inversely proportional to the pressure applied to the same. Hence a varying pressure will produce within such a series or column of carbon disks an inversely-varying resistance.

$g'$ $g^2$ $g^3$ represent a series of storage batteries.

$h'$ and $h^2$ are switches for turning on and off the lamps $f'$ $f^2$ $f^3$.

Having described my apparatus, I will now explain its action as follows: There can be but four conditions of the apparatus, to wit: first, when the circuit of the dynamo is broken and the lamps are turned off; second, when the dynamo is charging the battery and the lamps are turned off; third, when the dynamo is charging the battery and the lamps are turned on; fourth, when the circuit of the dynamo is broken and the lamps are turned on.

The objects which I accomplish by my system of regulation are two: (a) I confine the electromotive force and current of the dynamo within safe limits, and (b) maintain a constant electromotive force on the lamps, thus securing a constant brilliancy of the same regardless of the motion of the train.

First. Suppose that the dynamo is at rest and disconnected. The lamps are turned off and the core J is drawn back by the spring R. Now let the armature of the dynamo begin to revolve. As the speed increases the electromotive force at the brushes B' and B² will increase and current will flow through the coil E in the direction of the arrow. The positive brush of the dynamo is marked + and the negative —. As the coil G forms a shunt across the brushes B' and B² current will flow through said coil G. The tension in the spring R is so adjusted that when the electromotive force of the dynamo becomes equal to that of the storage battery the current flowing through the coil G will be sufficient to cause a strong enough magnetic attraction between the ends of the cores J and K to move the core J so that the wedge Q will make contact between the blocks T' and T². While the electromotive force of the dynamo and storage battery remain equal no current will flow between them, although the circuit is complete, for they are connected up to oppose one another.

Second. Now let the electromotive force of the dynamo be increased by revolving its armature faster. Current will flow from the positive brush B', wire 1, block T², wedge Q, block T', wire 2, coil H, wire 3, wire 4, through the battery $g'$ $g^2$ $g^3$, charging the same, thence through wire 5, coil F, wire 6, wire 7, coil V, and wire 8 back to the negative brush B². The current in passing through the coil H from the dynamo to the battery magnetizes the core K, tending to increase the pull already existing between the cores J and K by virtue of the current flowing through the coil G. The current flowing through the coil F in the direction indicated, increasing as the speed and the electromotive force of the dynamo increase, tends to demagnetize the field of the dynamo and thus prevent an abnormal rise in the electromotive force and current of the same, due to an increase of speed. If the dynamo be slowed down until its electromotive force is slightly lower than that of the battery, the latter will discharge or send current through the circuit to the dynamo in a reverse direction. This reversed or discharge current, flowing through the coil H in a reverse direction, will so magnetize the core K as to produce a repulsion between the cores J and K, and hence the spring R, aided by this repulsion, will draw the core J back and break the circuit at T' and T². The electromotive force of the dynamo may now be still further lowered, until it becomes zero, with entire impunity.

Third. Suppose the dynamo is running at a speed at which its electromotive force is greater than that of the battery. The wedge Q will be in contact with the blocks T' and T² and the dynamo will be charging the battery, the current passing through the coil F in the direction of the arrow and demagnetizing to a certain degree the field of the dynamo for the purpose aforesaid. Now let the switches $h'$ and $h^2$ be closed. Current will flow from the dynamo through the lamps by way of the brush B', wire 1, block T², wedge Q, block T', wire 2, coil H, wire 3, switch $h'$, wire 9, through the lamps $f'$ $f^2$ $f^3$, wire 10, plate $c^2$, carbon disks $e$, plate $c'$, wire 11, switch $h^2$, wire 7, coil V, wire 8 to brush B². If the electromotive force of the dynamo at the time the switches $h'$ and $h^2$ are closed is equal to or slightly greater than that of the storage battery, the current flowing through the coil V will not be sufficient to relieve the pressure on the carbon disks $e$, and hence the resistance of said disks will be almost zero, and thus no extra resistance will impede the current flowing to the lamps; but if the electromotive force of the dynamo at the time the switches $h'$ $h^2$ are closed is considerably higher than that of the battery then enough current will flow through coil V to relieve the pressure on the carbon disks $e$ to such an extent that sufficient resistance will now be introduced into the lamp-circuit to prevent more than the normal electromotive force from being applied to the lamps. If the dynamo were running at a slow speed and unable to charge the battery and light the lamps both, the battery would discharge and thus aid the dynamo in lighting the lamps; but in so doing the current from the battery would flow through the coil F in a direction opposite to the arrow and tend to strengthen the field of the dynamo and thus render the dynamo more effective at the slow speed.

Fourth. If the dynamo should now be slowed down and disconnected in the manner previously described, the lamps would remain lighted directly from the storage battery, the current being short-circuited from the coil F and carbon disks $e$ by the wedge P, connecting the blocks S' and S². The current would flow from the positive pole of the battery + through wire 4, switch $h'$, wire 9, lamps $f'' f^2$ $f^3$, wire 10, wire 12, block S², wedge P, block S', wire 13 to the negative pole of the storage battery $g'$ $g^2$ $g^3$. The electromotive force now impressed by the battery on the lamps would be that of a freshly-charged battery, and such electromotive force I have called "normal." The electromagnetic governor U would be so adjusted as to prevent a greater electromotive force than the normal from being impressed upon the lamps.

I do not confine myself to the coil V being wound with coarse wire and connected in series with the dynamo, as shown. Said coil might be wound with fine wire and connected as a shunt to the brushes B' and B². It does not matter where the coil V is connected or how it is wound provided it is so wound and so connected as to be responsive to the increase and decrease in the electromotive force of the dynamo. The resistance formed by the carbon disks $e$ might be replaced by any known form of variable resistance and be operated by an electromagnet in the manner I have described. For convenience and simplicity I prefer the carbon disks controlled by an electromagnet wound and connected as shown.

If the dynamo has difficulty in exciting itself as a shunt-wound machine, the terminals of the coil E can be connected to the terminals of the storage battery $g'$ $g^2$ $g^3$, as indicated by dotted lines, thus insuring an approximately constant and separate excitation of the field of said dynamo at all times. A switch to be operated by hand or automatically could be used to break the circuit through the coil E when the dynamo was at rest.

By means of the hand-rheostat R$h$ the current flowing through the coil E, with which said rheostat is in series, can be varied in order to adjust the electromotive force of the dynamo.

In this specification the armature of the dynamo is supposed to run in one direction only. If the direction of rotation suffer reversal, means must be provided to maintain constant the polarity of the brushes B' and B². I can accomplish this by means of the device on which I obtained United States Letters Patent No. 525,836, dated September 11, 1894.

For simplicity I have shown the wedge Q operated by the core J. It might be preferable to short-circuit the coil F and the carbon disks $e$ by means of an independent electromagnetic switch, which would connect the blocks S' and S² at the proper time. There are several methods of doing this, all well known and understood. I do not confine myself to the particular device shown in the drawing.

What I claim as my invention, and desire to secure by Letters Patent, is—

1. The herein-described method of automatically maintaining constant the electromotive force on the translating devices in a working circuit supplied by a storage battery, and of controlling the current and electromotive force of the dynamo which charges said storage battery, consisting in demagnetizing the field of said dynamo by the charging-current as the speed of said dynamo increases, and in increasing the resistance in said working circuit as the electromotive force of said dynamo increases with increasing speed.

2. The herein-described method of automatically maintaining constant the electromotive force on the translating devices in a working circuit supplied by a storage battery and of controlling the current and electromotive force of the dynamo which charges said storage battery, consisting in strengthening the field of said dynamo by the discharge-current which said storage battery delivers to said working circuit to aid said dynamo and to increase the electromotive force of the same when said dynamo runs at a speed too low to enable the same to operate said translating devices in said working circuit, and in decreasing the resistance in said working circuit as the electromotive force of said dynamo decreases with decreasing speed.

3. The herein-described method of automatically maintaining constant the electromotive force on the translating devices in a working circuit supplied by a storage battery, and of controlling the current and electromotive force of the dynamo which charges said storage battery, consisting in strengthening the field of said dynamo by the discharge-current which said storage battery delivers to said working circuit to aid said dynamo and to increase the electromotive force of the same when said dynamo runs at a speed too low to enable the same to operate said translating devices in said working circuit, in decreasing the resistance in said working circuit as the electromotive force of said dynamo decreases with decreasing speed, and in establishing a direct connection between said storage battery and said working circuit by short-circuiting all apparatus through which the discharge-current from said storage battery to said working circuit would otherwise have to pass whenever said dynamo is disconnected from said storage battery and said working circuit.

4. The combination in a system of electric lighting of a dynamo, a storage battery, a coarse-wire field-coil on said dynamo connected in series with said storage battery and the armature of said dynamo in such a manner that when said dynamo charges said storage battery the current flowing through said coarse-wire coil tends to demagnetize the field of said dynamo, a fine-wire field-coil on said dynamo which furnishes the normal excitation for and determines the polarity of said dynamo, a working circuit containing translating devices connected as a shunt to the armature of said dynamo, and a variable resistance in series with the translating devices in said working circuit said variable resistance being so arranged and so controlled that a constant electromotive force is maintained on the translating devices in the working circuit independently of the variations in the electromotive force of the armature of said dynamo substantially as described.

5. The combination in a system of electric lighting of a dynamo, a storage battery, a coarse-wire field-coil on said dynamo connected in series with said storage battery and the armature of said dynamo in such a manner that when said dynamo charges said storage battery the current flowing through said coarse-wire coil tends to demagnetize the field of said dynamo, a fine-wire field-coil on said dynamo which furnishes the normal excitation for and determines the polarity of said dynamo, a working circuit containing translating devices connected as a shunt to the armature of said dynamo, a variable resistance in series with the translating devices in said working circuit and an electromagnet responsive to the variations in the electromotive force of said dynamo said electromagnet controlling said variable resistance in such a manner that the electromotive force on the translating devices in said working circuit will remain constant, substantially as described.

6. The combination in a system of electric lighting of a dynamo, a storage battery, a coarse-wire field-coil on said dynamo connected in series with said storage battery and the armature of said dynamo in such a manner that when said dynamo is charging said storage battery the current flowing through said coarse-wire coil tends to demagnetize the field of said dynamo, a fine-wire field-coil on said dynamo which furnishes the normal excitation for and determines the polarity of said dynamo, a working circuit containing translating devices connected as a shunt to the armature of said dynamo, a variable resistance in series with the translating devices in said working circuit, an electromagnet responsive to the variations in the electromotive force of said dynamo said electromagnet controlling said variable resistance in such a manner that the electromotive force on the translating devices in said working circuit will remain constant, and an automatic electromagnetic circuit-breaker which controls the connection between said dynamo and said storage battery and working circuit having one coil connected as a shunt to the armature of said dynamo and the other coil connected in series with said armature of said dynamo substantially as described.

7. The combination in a system of electric lighting of a dynamo, a storage battery, a coarse-wire field-coil on said dynamo connected in series with said storage battery and the armature of said dynamo in such a manner that when said dynamo is charging said storage battery the current flowing through said coarse-wire coil tends to demagnetize the field of said dynamo, a fine-wire field-coil on said dynamo which furnishes the normal excitation for and determines the polarity of said dynamo, a working circuit containing translating devices connected as a shunt to the armature of said dynamo, a variable resistance in series with the translating devices in said working circuit, an electromagnet responsive to the variations in the electromotive force of said dynamo said electromagnet controlling said variable resistance in such a manner that the electromotive force on the translating devices in said working circuit will remain constant, an automatic electromagnetic circuit-breaker which controls the connection between said dynamo and said storage battery and working circuit having one coil connected as a shunt to the armature of said dynamo and the other coil connected in series with said armature of said dynamo, and an automatic electromagnetic switch which removes a short circuit from said coarse-wire coil and said variable resistance immediately after said circuit-breaker closes and connects said armature of said dynamo with said storage battery and working circuit and which switch replaces a short circuit on said variable resistance and said coarse-wire coil just before said circuit-breaker opens substantially as described.

8. The combination in a system of electric lighting of a dynamo, a storage battery, a coarse-wire field-coil on said dynamo connected in series with said storage battery and the armature of said dynamo in such a manner that when said dynamo is charging said storage battery the current flowing through said coarse-wire coil tends to demagnetize the field of said dynamo, a fine-wire field-coil on said dynamo connected as a shunt to said storage battery said fine-wire coil in this manner furnishing an approximately constant and separate excitation of the field of said dynamo, and a working circuit containing translating devices connected as a shunt to the armature of said dynamo substantially as described.

9. The combination in a system of electric lighting of a dynamo, a storage battery, a coarse-wire field-coil on said dynamo connected in series with said storage battery and the armature of said dynamo in such a manner that when said dynamo is charging said storage battery the current flowing through said coarse-wire coil tends to demagnetize the field of said dynamo, a fine-wire field-coil on said dynamo connected as a shunt to said storage battery said fine-wire coil in this manner furnishing an approximately constant and separate excitation of the field of said dynamo, a working circuit containing translating devices connected as a shunt to the armature of said dynamo, and a variable resistance in series with the translating devices in said working circuit said variable resistance being so arranged and so controlled that a constant electromotive force is maintained on the translating devices in said working circuit independently of the variations in the electromotive force of the armature of said dynamo substantially as described.

10. The combination in a system of electric lighting of a dynamo, a storage battery, a coarse-wire field-coil on said dynamo connected in series with said storage battery and the armature of said dynamo in such a manner that when said dynamo is charging said storage battery the current flowing through said coarse-wire coil tends to demagnetize the field of said dynamo, a fine-wire field-coil on said dynamo connected as a shunt to said storage battery said fine-wire coil in this manner furnishing an approximately constant and separate excitation of the field of said dynamo, a working circuit containing translating devices connected as a shunt to the armature of said dynamo, a variable resistance in series with the translating devices in said working circuit, and an electromagnet responsive to the variations in the electromotive force of said dynamo said electromagnet controlling said variable resistance in such a manner that the electromotive force on the translating devices in said working circuit will remain constant substantially as described.

11. The combination in a system of electric lighting of a dynamo, a storage battery, a coarse-wire field-coil on said dynamo connected in series with said storage battery and the armature of said dynamo in such a manner that when said dynamo is charging said storage battery the current flowing through said coarse-wire coil tends to demagnetize the field of said dynamo, a fine-wire field-coil on said dynamo connected as a shunt to said storage battery said fine-wire coil in this manner furnishing an approximately constant and separate excitation of the field of said dynamo, a working circuit containing translating devices connected as a shunt to the armature of said dynamo, a variable resistance in series with the translating devices in said working circuit, an electromagnet responsive to the variations in the electromotive force of said dynamo said electromagnet controlling said variable resistance in such a manner that the electromotive force on the translating devices in said working circuit will remain constant, and an electromagnetic circuit-breaker which controls the connection between said dynamo and storage battery and working circuit having one coil connected as a shunt to the armature of said dynamo and the other coil connected in series with said armature of said dynamo substantially as described.

12. The combination in a system of electric lighting of a dynamo, a storage battery, a coarse-wire field-coil on said dynamo connected in series with said storage battery and the armature of said dynamo in such a manner that when said dynamo charges said storage battery the current flowing through said coarse-wire coil tends to demagnetize the field of said dynamo, a fine-wire field-coil on said dynamo connected as a shunt to said storage battery said fine-wire coil in this manner furnishing an approximately constant and separate excitation of the field of said dynamo, a working circuit containing translating devices connected as a shunt to the armature of said dynamo, a variable resistance in series with the translating devices in said working circuit, an electromagnet responsive to the variations in the electromotive force of said dynamo said electromagnet controlling said variable resistance in such a manner that the electromotive force on the translating devices in said working circuit will remain constant, an automatic electromagnetic circuit-breaker which controls the connection between said dynamo and said storage battery and working circuit having one coil connected as a shunt to the armature of said dynamo and the other coil connected in series with said armature of said dynamo, and an automatic electromagnetic switch which removes a short circuit from said coarse-wire coil and said variable resistance immediately after said circuit-breaker closes and connects said armature of said dynamo with said storage battery and working circuit and which switch replaces a short circuit on said variable resistance and said coarse-wire coil just before said circuit-breaker opens substantially as described.

Signed at Brooklyn, in the county of Kings and State of New York, this 4th day of May, A. D. 1896.

WILLIAM L. BLISS.

Witnesses:
   GEO. H. BLISS,
   C. B. C. FOWLER.